(12) United States Patent
Sarkar et al.

(10) Patent No.: US 10,908,683 B2
(45) Date of Patent: Feb. 2, 2021

(54) EYE-TRACKING CALIBRATION (71) Applicant: AdHawk Microsystems, Kitchener (CA)

(72) Inventors: Niladri Sarkar, Waterloo (CA); Fan Yang, London (CA); Arash Rohani, Waterloo (CA)

(73) Assignee: AdHawk Microsystems, Ontario (CA)

( * ) Notice: Subject to any disclaimer, the term of this patent is extended or adjusted under 35 U.S.C. 154(b) by 110 days.

(21) Appl. No.: 16/236,993

(22) Filed: Dec. 31, 2018

(65) Prior Publication Data
US 2019/0204913 A1 Jul. 4, 2019

Related U.S. Application Data (60) Provisional application No. 62/612,086, filed on Dec. 29, 2017.

(51) Int. Cl.
G06F 3/01 (2006.01)
G02B 27/01 (2006.01)
G02B 27/00 (2006.01)

(52) U.S. Cl.
CPC .......... *G06F 3/013* (2013.01); *G02B 27/0093* (2013.01); *G02B 27/017* (2013.01); *G02B 27/0179* (2013.01); *G06F 3/012* (2013.01); *G06F 3/017* (2013.01); *G02B 2027/0178* (2013.01); *G02B 2027/0187* (2013.01)

(58) Field of Classification Search
CPC ....... A61B 3/113; A61B 3/0025; A61B 5/163; G06K 9/00604; G06F 3/013
USPC ........................................................ 351/209
See application file for complete search history.

(56) References Cited

U.S. PATENT DOCUMENTS

| 2004/0061831 | A1* | 4/2004 | Aughey | G06F 3/013 351/209 |
| 2016/0029883 | A1* | 2/2016 | Cox | G06K 9/00604 351/209 |
| 2016/0166146 | A1 | 6/2016 | Sarkar | |

* cited by examiner

*Primary Examiner* — Mohammed A Hasan
(74) *Attorney, Agent, or Firm* — Kaplan Breyer Schwarz, LLP (57) ABSTRACT Aspects of the present disclosure describe an improved calibration method for systems, methods, and structures that provide eye-tracking by 1) steering a beam of light through the effect of a microelectromechanical system (MEMS) onto a surface of the eye and 2) detecting light reflected from features of the eye including corneal surface, pupil, iris—among others. Positional/geometric/feature/structural information pertaining to the eye is determined from timing information associated with the reflected light.

18 Claims, 7 Drawing Sheets

EYE-TRACKING CALIBRATION

CROSS REFERENCE TO RELATED APPLICATIONS

This application claims the benefit of U.S. Provisional Patent Application Ser. No. 62/612,086 filed 29 Dec. 2017 which is incorporated by reference as if set forth at length herein. In addition, this application includes concepts disclosed in United States Patent Publication No. 2016/0166146 published 16 Jun. 2016 and United States patent Publication No. 2017/0276934, each of which is incorporated by reference as if set forth at length herein.

TECHNICAL FIELD

This disclosure relates generally to human-computer interfaces and more specifically to eye-tracking systems, methods and structures that advantageously provide real-time measurements of eye-tracking and eye fixations. Of particular significance, this disclosure provides for the improved calibration of eye-tracking systems, methods, and structures.

BACKGROUND

As is known by those skilled in the art, human-computer interfaces are expected to take advantage of visual input mechanisms including eye-tracking mechanisms—resulting from a current trend in the emerging Virtual and Augmented Reality (VR/AR) enterprise Of additional note, such eye-tracking mechanisms are expected to find widespread applicability in medical ophthalmology, behavioral psychology, and consumer measurement fields as well.

Those skilled in the art will readily understand and appreciate that for eye-tracking mechanisms to be most effective, their calibration is of critical importance. Given such applicability and importance of eye-tracking, the improved calibration of eye-tracking systems, methods, structures would represent a welcome addition to the art.

SUMMARY

An advance in the art is made according to aspects of the present disclosure directed to the improved calibration of systems, methods, and structures providing eye-tracking that advantageously facilitate a seamless, intuitive, non-invasive, interactive user interface between that user and smart devices including computers.

In sharp contrast to the prior art, an improved eye-tracker calibration method according to the present disclosure involves: providing a user with the eye-tracker; having the user look at a fixed point in space; having the user rotating his/her head about an axis; collecting head positional and eye-tracking data including eye angle; and generating a map of the user's eye angle to gaze vector.

When such method according to the present disclosure is accompanied by an additional aspect of the present disclosure—namely associating such calibration data with a particular user—repeated removal and replacement of the eye-tracker requires only minimal or no recalibration. In addition, when such calibration according oto aspects of the present disclosure is continuously performed, inadvertent slip of the eye-tracker on the user's face can be advantageously compensated in real time—without requiring further user re-calibration.

BRIEF DESCRIPTION OF THE DRAWING

A more complete understanding of the present disclosure may be realized by reference to the accompanying drawing in which.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Drawing, including any functional blocks that may be labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the FIGS comprising the drawing are not drawn to scale.

As will become apparent to those skilled in the art, systems, methods, and structures according to aspects of the present disclosure advantageously extend the capabilities of gesture tracking systems disclosed in U.S. Patent Publication No. US2016/0166146 (hereinafter referred to as the '146 publication), which disclosed scanning microelectromechanical systems that determine the position of an eye by directing a beam of light towards the eye and determining the unique angle at which the beam reflects off the cornea of the eye to determine the direction of the gaze of the user. Systems in accordance with the '146 publication enable eye tracking that can be faster, lower power, more precise, and lower cost than prior-art video-based systems.

Figure 1:
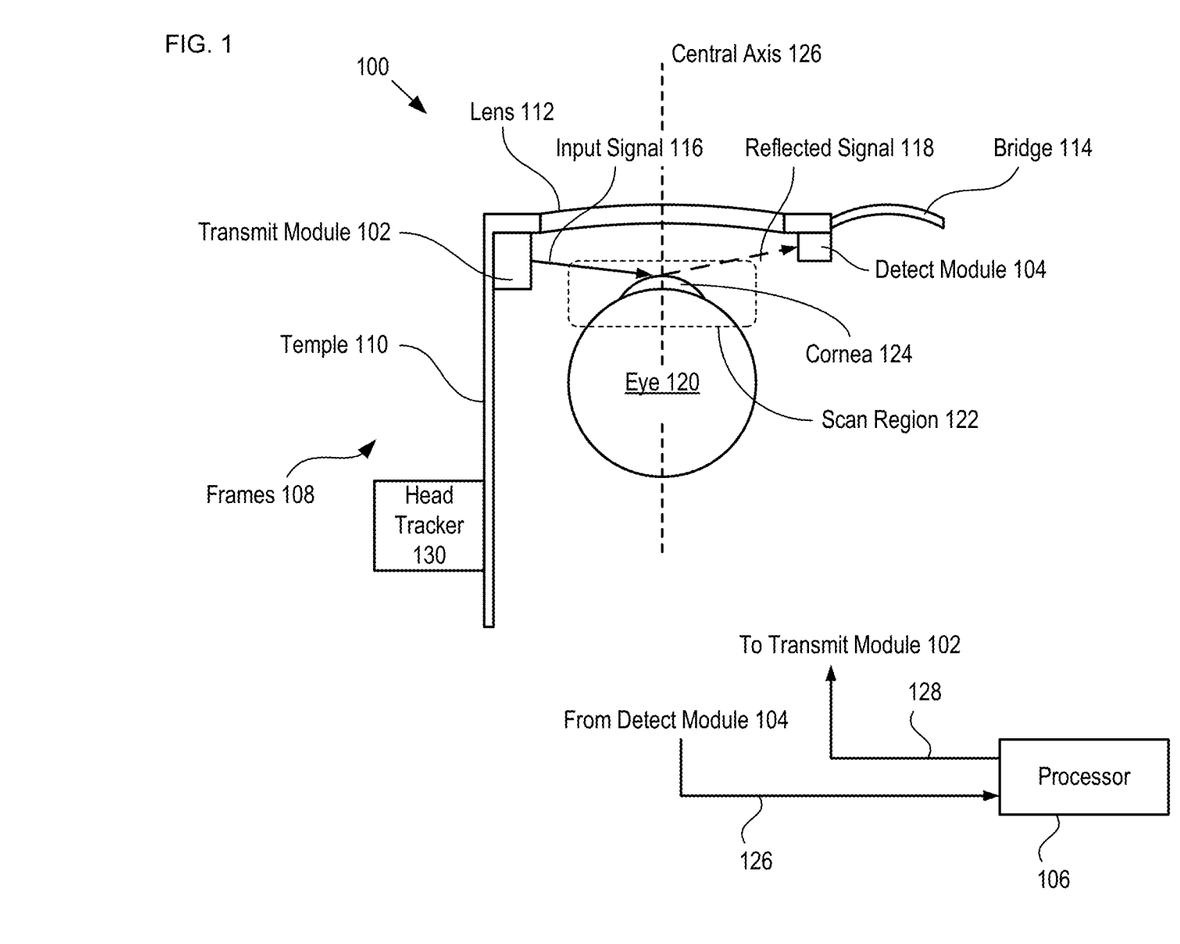
FIG. 1 is a schematic block diagram showing an illustrative eye tracking system according to aspects of the present disclosure.

FIG. 1 shows a schematic block diagram illustrating an eye tracking system according to aspects of the present disclosure. As will be apparent to those skilled in the art by inspection of this figure and the following discussions, such illustrative systems constructed according to aspects of the present disclosure advantageously exhibit substantial improvements in size, cost, power consumption, bandwidth and precision as compared with prior art eye-tracking systems.

With reference to FIG. 1, illustrative system 100 includes one or more transmit module(s) 102, detect module(s) 104 (that may include multiple individual detectors)—not specifically shown, processor(s) 106 and head tracker 130. Note that for simplicity in the drawing, only single module(s) are shown in this illustrative figure. Those skilled in the art will of course appreciate that the number(s) and function(s) of the module(s) are not fixed, and instead may include a plurality of same. Still further, their respective position(s) may likewise be varied from those illustratively shown including spaced-apart relative to one another and/or arranged in a pre-determined or no particular arrangement around—for example—eyeglass frames or goggles or shield or other mechanical support.

Continuing with our discussion, transmit module 102 and detect module 104 are illustratively shown arranged on a rigid support in a fixed orientation relative to an eye 120 of a test subject. As we shall show and describe, system 100 enables tracking of a surface feature (e.g., cornea 124 or other feature including pupil, iris, sclera—not specifically shown) within a two-dimensional region of an eye during typical test subject behavior (e.g., reading, viewing a computer screen, watching television, monitoring a scene, shopping, other consumer activities, responding to stimulus, etc.), and estimating and/or determining the corneal vector of the eye based on the location of the surface feature (and perhaps other characteristics).

For the purposes of this Specification, including the appended claims, the "corneal vector" or "gaze vector" of an eye is defined as the gaze direction of the eye. As may be readily appreciated by those skilled in the art, we note that the optical axis of an eye is not the same as a visual axis. More specifically, the optical axis may be substantially aligned—for illustrative example—with an optical centerline of the eye while the visual axis is more substantially aligned with a visual acuity location of the eye, namely the fovea centralis. The fovea is responsible for sharp central vision, which is necessary in humans for activities where visual detail is of primary importance, such as reading and driving. Accordingly, a gaze vector is preferably indicated by a vector extending outward along the visual axis. As used herein and as will be readily understood by those skilled in the art, "gaze" suggests looking at something—especially that which produces admiration, curiosity or interest—among other possibilities.

Transmit module 102 is a sub-system for providing an optical signal and scanning it in two-dimensions over a scan region 122 of eye 120. Transmit module 102 provides input signal 116, which is a light beam directed at eye 120. Exemplary transmit modules are described in detail in the '146 publication; however, it should be noted that transmit modules in accordance with the present invention are not limited to those disclosed in the '146 publication.

Detect module 104 is a sub-system for receiving light reflected from scan region 122, providing an electrical signal based on the intensity of the reflected light, and detecting—among other possible things—one or more maxima in the electrical signal. Exemplary detect modules are described in detail in the '146 publication; however, it should be noted that detect modules in accordance with the present invention are not limited to those disclosed in the '146 publication. As noted previously, while only a single detect module is shown in the illustrative FIG. 1, those skilled in the art will appreciate that more than one detect module may be employed—each having one or more individual detectors included therein. As will become further appreciated, such configurations including multiple detect modules and/or multiple detectors therein, provide additional data/information according to aspects of the present disclosure. We note at this point that the above discussion generally describes the detection of maxima. Advantageously, minima are also possible to detect in the case of the pupil. We note further that such systems, methods and structures constructed according to aspects of the present disclosure may detect/identify edges of features which may be more difficult to identify. In such an application, we may advantageously edge outlines of features and fit—for example—ellipses to facilitate their identification.

Continuing with our discussion of FIG. 1, processor 106 may be a conventional digital processor and controller (e.g., a microcontroller, microcomputer, etc.) operative for controlling transmit module 102, establishing system timing, and estimating the two-dimensional location of cornea (for example) 124 within scan region 122. In the depicted example, processor 106 communicates with transmit module 102 and detect module(s) 104 via wired connections (not shown) to transmit and receive control signals 126 and output signal 128. In some embodiments, processor 106 communicates with transmit module 102 and detect module 104 wirelessly. In some further embodiments, processor 106 is integrated in one of transmit module 102 and detect module(s) 104. Note further that in those embodiments including multiple detector modules there may be multiple output signal 128 lines communicating with processor. Note further that in those configurations including multiple detectors included as part of a single detector module, the multiple detectors may provide individual, multiple signal lines to the processor as well or may be locally processed by detector module thereby providing a single signal to the processor.

In the depicted, illustrative example, system 100 is mounted on eyeglass frames 108, which includes temples 110, lenses 112, and bridge 114. System 100 is shown mounted on frames 108 such that transmit module 102 and detect module(s) 104 are on opposite sides of central axis 126 of eye 120. Specifically, transmit module 102 is mounted on the frames such that it can scan input signal 116 over the full extent of scan region 122 and detect module(s) 104 is/are mounted on the frames such that it/they can receive a portion of input signal 116 reflected from scan region 122 as reflected signal 118. As noted previously, one or more detect module(s) may include one or more individual detectors which, as we shall show and describe, advantageously provide enhanced performance and informational value for systems, methods, and structures according to the present disclosure as compared with the prior art.

In particular, the specific location(s) of the one or more detect modules including one or more individual discrete detectors may be adjustable on the frame structures such that systems, method, and structures according to the present disclosure may advantageously provide enhanced informational value for a larger portion of the population. We note further that multiple detect modules and or multiple detectors advantageously improve robustness, more accurate eye profiles, geometry determinations, in addition to the improved gaze direction data already noted.

Finally, head tracker 130 is a tracking system for monitoring the position (angular deflection) of a wearer's (user) head. In some embodiments head tracker may include a different device/system for tracking the position of a user's head, such as an inertial motion unit (IMU), gyroscope, one or more alternative sensors, and the like. In addition, we now note that specific positioning and/or feature identification mechanisms may advantageously include timer-based methods that may further advantageously employ Lissajous or other curve/patterning methodologies that are described in related applications by the present Applicant and incorporated herein.

Figure 2A:
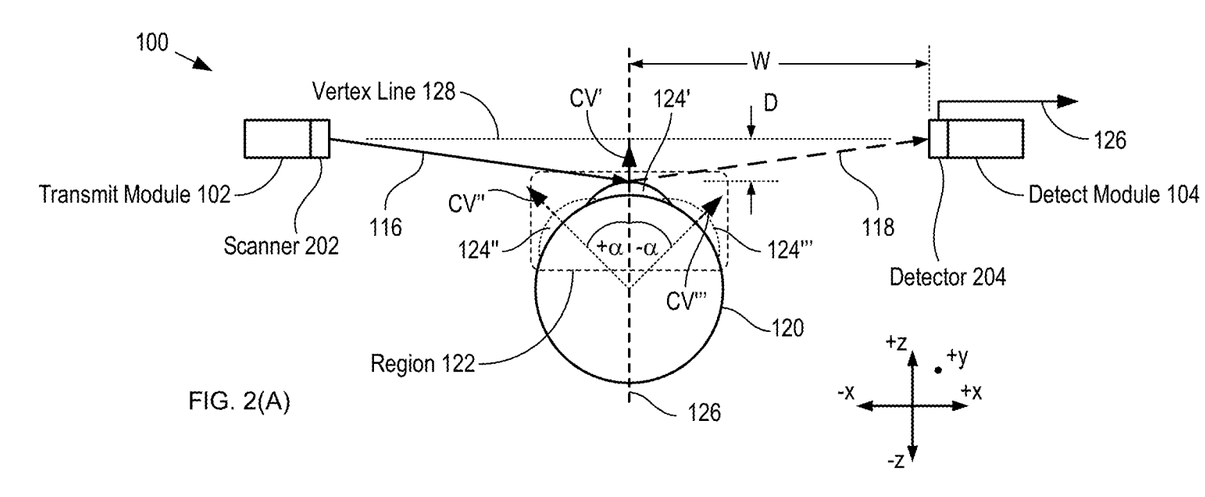
FIG. 2(A) is a schematic diagram showing an illustrative geometric arrangement of the system of FIG. 1 according to aspects of the present disclosure.

FIG. 2(A) is a schematic diagram depicting an illustrative geometric arrangement for system 100. At this point that it is noted that according to one aspect of the present disclosure that there exists a configuration of system 100 that gives rise to a unique point on cornea 124 that results in a maximum intensity in the reflection of input signal 116 (i.e., reflected signal 118) at detector(s) 204 of detect module(s) 104, where detector(s) 204 is/are a discrete detector. For the purposes of this disclosure, including the appended claims, a "discrete detector" is defined as an optoelectronic device having no more than four electrically independent detection regions on a single substrate, where each detection region is operative for providing one electrical signal whose magnitude is based on the intensity of light incident upon that detection region. Examples of discrete detectors include detectors having only one detection region, split detectors having two detection regions, four-quadrant detectors having four detection regions, and position-sensitive detectors. The definition of discrete detector explicitly excludes individual pixels, or groups of pixels, within array devices for collectively providing spatially correlated image information, such as focal-plane arrays, image sensors, and the like. When input signal 116 is aligned with this point, the angular positions of scanner 202 within transmit module 102 are indicative of the location of this point of maximum reflection within scan region 122, which is indicative of the corneal vector for the eye.

As may be observed from FIG. 2(A), are position(s) of cornea 124 at three gazing positions namely, (1) gazing straight ahead and aligned with central axis 126, as indicated by cornea 124' and corneal vector CV'; (2) gazing in the extreme positive direction, as indicated by cornea 124" and corneal vector CV"; and (3) gazing in the extreme negative direction, as indicated by cornea 124''' and corneal vector CV'''.

Figure 2B:
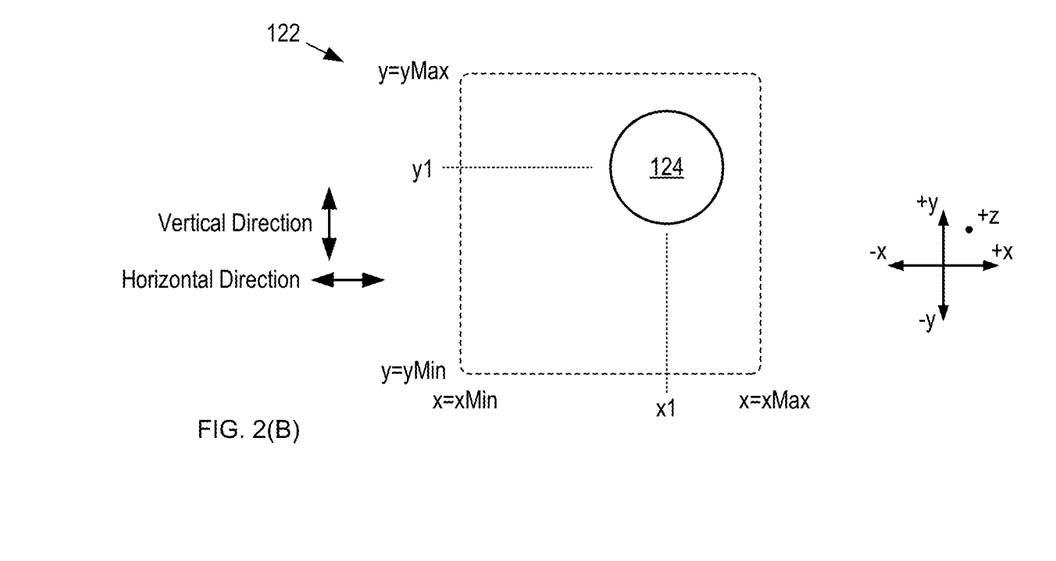
FIG. 2(B) is a schematic diagram showing illustrative scan regions for arrangements such as those depicted in FIG. 2(A) and others according to aspects of the present disclosure.

Turning now to FIG. 2(B), there is shown a schematic diagram depicting an exemplary scan region 122 of a subject eye. As illustratively depicted, scan region 122 extends from x=xMin to x=xMax and from y=yMin to y=yMax in the x- and y-directions, respectively.

During an illustrative operation of system 100, scanner 202 sweeps input signal 116 over scan region 122 in two dimensions. When the input signal is incident on cornea 124, reflected signal 118 (i.e., the corneal reflection) sweeps over detector 204. We note that during operation—and as we shall show an describe—the two dimensional scan may occur simultaneously i.e, it moves in both directions simultaneously and may be projected onto the eye in a specific pattern to provide enhanced operation. It should be noted that the curvature of the cornea gives rise to a reflective condition that reduces the angle-of-reflection to a narrow range of scanner angles. The position of the scanner that corresponds to the maximum received intensity at the aperture of detector 204 is then used to calculate the location of the cornea, which is then used to estimate corneal vector CV.

As previously noted, the particular sweep of input signal may advantageously be shaped over scan region(s) such that a desired sweep density is achieved thereby producing a desirable (i.e., greatest) density of received pulses produced by the one or more discrete detectors. While the particular sweep shape is user definable, one particular shape—the Lissajous—produces a surprisingly effective sweep and therefore pulse densities.

Those skilled in the art will appreciate that a Lissajous curve—also known as a Lissajous figure—is the graph of a system of parametric equations defined by $x=A \sin(at +\delta)$; $y=B \sin(at)$. In one exemplary operation, the sweep is performed such that the rate of change of the x coordinate is substantially the same as the rate of change of the y coordinate.

We note at this time that a typical human eye has an eyeball diameter of approximately 24 mm and a cornea having an approximately 6.5 mm radius of curvature, with the cornea projecting a few millimeters above the eye, thereby defining a surface feature. Based upon this typical eye configuration, in the depicted illustrative example, transmit module 102 and detect module 104 are shown positioned symmetrically about central axis 126 at half-width, W, (half the normal distance across a typical eyeglass lens) of approximately 25 mm. Vertex line 128 is a straight line connecting the center of scanner 202 and the center of the aperture of detector 204. Vertex distance, D, (i.e., the distance between vertex line 128 and the apex of cornea 124 when the eye is aligned with central axis 126) is selected as approximately 14 mm. The locations of transmit module 102 and detect module(s) 104 are selected to substantially maximize the range over which a reflected signal 118 is received for all corneal locations within scan region 122.

We note that the configuration/distances described above are only for illustrative purposes only. As will be readily appreciated, the particular geometries/feature location(s) will vary from individual to individual. As such, systems, methods, and structures according to the present disclosure do not necessarily require the particular configurations noted. In particular, a scanner may be located in most any location providing optical paths to the surface of the eye and its scan region to be scanned. As such, the scanner may be positioned on the nose side, the bottom, or the outside—or practically any location—of the support frame. When so positioned, the multiple detector elements may be positioned circumferentially around the frame, or in other locations from which suitable reflections may be detected.

We note that the '146 publication referenced previously, discloses a method for determining eye position (i.e., corneal position) when a reflected light signal exhibits a maximum intensity. In contrast, systems, methods, and structures according to the present disclosure advantageously employ tracking methodologies that may advantageously include one or more of the following: pulse-width tracking; leading-edge tracking; last-edge tracking; modulated tracking; and noise-rejecting double sampling.

We note that it is at least one aspect of the present disclosure that the vestibulo-ocular reflex (VOR) may be exploited to enable a rapid calibration routine that enables eye tracking with greater accuracy than can be realized by the prior art.

As will be readily understood and appreciated by those skilled in the art, the VOR is a reflex, where activation of the vestibular system causes eye movement. This reflex functions to stabilize images on the retinas during head movement by producing eye movements in a direction opposite to head movement, thus preserving the images on the center of the visual field(s). For example, when the head moves to the right, the eyes move to the left—and vice versa. Since slight head movement is present continuously, VOR is necessary for stabilizing vision.

Figure 3A:
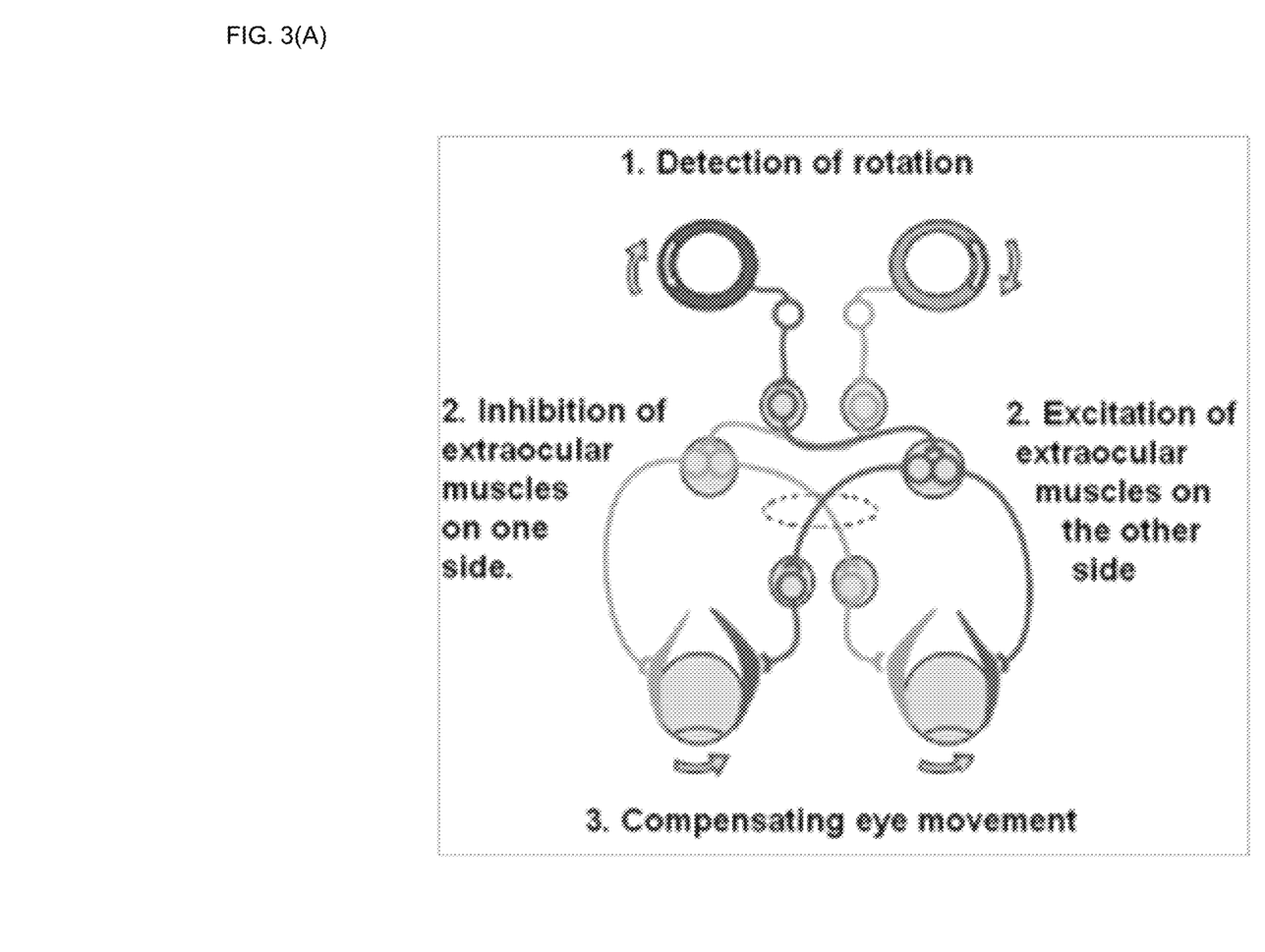
FIG. 3(A) is a schematic diagram illustrating a vestibulo-ocular reflex (VOR) wherein a rotation of the head is accompanied by compensatory movement of the eyes according to aspects of the present disclosure.

FIG. 3(A) is a schematic diagram illustrating the VOR. As may be observed, when a rotation of the head is detected, an inhibitory signal to the extraocular muscles on one side and an excitatory signal to the muscles of the other side are triggered. This results in compensatory movement of the eyes.

As may be further appreciated, the VOR has both rotational and translational aspects. When the head rotates about any axis (horizontal, vertical, or torsional) visual images are stabilized by rotating the eyes about the same axis—but in the opposite direction. When the head translates, a visual fixation point is maintained by rotating gaze direction by an amount that depends on distance.

We note that while the head rotates, a gyroscope, head tracker, or other sensor that measures the angular deflection of the head may be compared to the eye angle in order to obtain a number (i.e., many thousands) of artefact-free calibration points. If the user's gaze is fixed to a single point in space while the head is rotating, the captured data (from the eye tracker and the head tracker) may be used to determine a mapping from the eye position to the gaze direction.

Figure 3B:
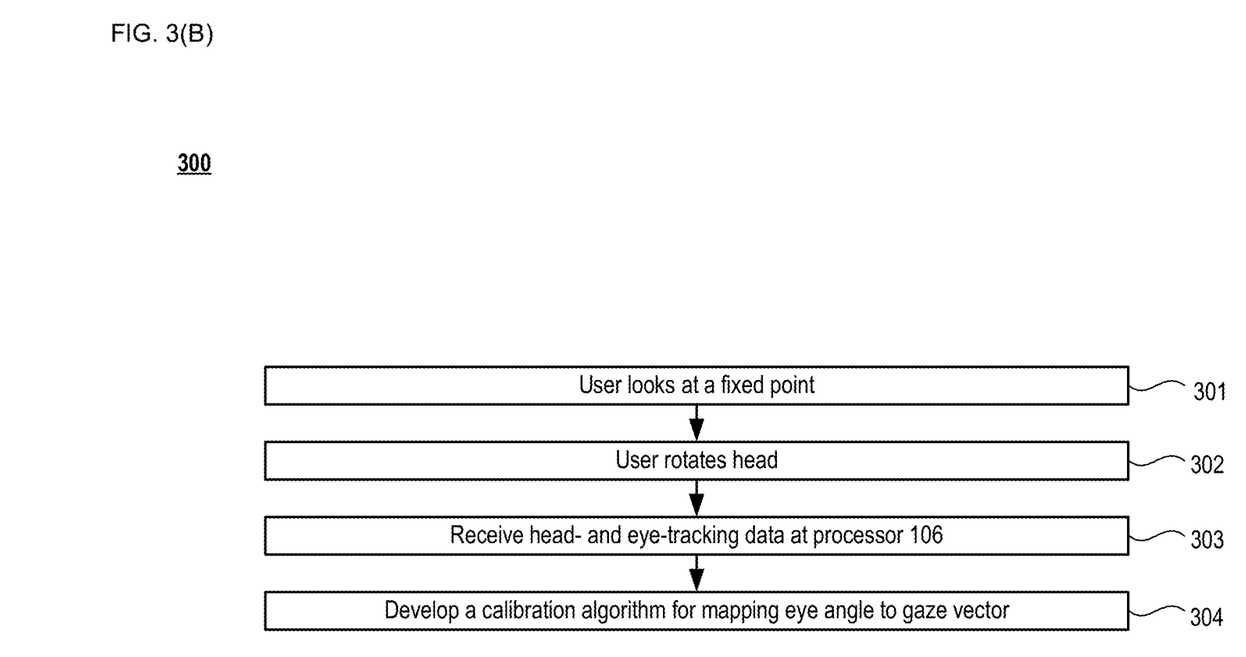
FIG. 3(B) is a flow diagram showing an illustrative calibration method for an eye tracking system according to aspects of the present disclosure.

FIG. 3(B) is a flow diagram illustrating operational aspects of an illustrative method for calibration of an eye-tracking system according to aspects of the present disclosure. With reference to that figure, method 300 begins at step 301 wherein a user looks at a fixed point in space or within a VR headset display where the system is tracking the head position using—for example—inside-out or outside-in tracking. At step 302 the user rotates their head while continuing to look at the fixed point. At step 303, the head tracker provides 130 head position data 132 to processor 106 and system 100 provides eye-tracking data 126 to processor, where each data point of head tracking 132 is correlated with a data point of eye-tracking data 126.

At step 304 processor 106 determines a calibration model that maps eye angle to gaze vector based on the head/eye position data pairs, 6 degrees of freedom, eye position, eye position to head angle, etc. Once such determination is made, the calibration may be applied to subsequent eye position measurements. In addition, such a calibration methodology may be repeatedly performed to ensure continued accuracy of the eye-tracking measurements. As we shall show and describe further, such method may be made for a specific user and further may be tolerant of slip invariance including the removal of headset/glasses and their subsequent re-wearing.

At this point we note that during the operation of the method so described, the methods advantageously collects glint locations while the user is looking at the fixed target in space while rotating their head—thereby counter-rotating their eyes. These glint locations—which may advantageously be captured in mirror angles—are mapped to a gaze vector.

We note further that as previously noted, there systems, methods, and structures—and in particular the calibration methods—may advantageously employ multiple photodetectors arranged about or around—i.e. circumferentially—the eyeglass/goggle frames comprising the system. When configured with multiple photodetectors, significant surprising benefits emerge according to aspects of the present disclosure.

In particular, when so configured, glints (light reflected from the eye and/or specific eye structures) may be used to determine by inference or other methods the location of the center of the eye—without the need for a "ground truth measurement"—i.e., we don't need to know the location of the fixed point in space at which the user is looking. Instead—we only need to detect/capture the glints while the eye is moving in order to subsequently estimate the center of the eye.

Additionally, once a model of the location of the center of both eyes is constructed, the user may remove the glasses/headset including the eye-tracker and subsequently put it back on—advantageously without having to re-calibrate. To accomplish same, an individual user profile is constructed and maintained which includes the specific user's calibration data/configuration. Of further advantage, such user profile and associated calibration configuration data may be used to compensate for "slip"—the movement of the glasses/headset with respect to the user's face during or after calibration. Of further advantage, the model may be continuously updated such that a constant update with respect to the user's eye center is determined and slip and/or replacing is constantly refined.

Yet another alternative method according to the present disclosure for calibration of eye-tracking systems includes only a single photodetector. In such a configuration, wherein the photodetector is positioned preferably opposite to the light source—although any position around the eye is acceptable—glint locations are captured along with head rotation measurements. Such head rotation measurements are determined by any of a number of mechanisms already described. The head rotation measurement—coupled with knowledge of the location in space of the fixed object that the user is gazing at—permits the determination. More specifically, a mathematical transformation from glint angle(s) to gaze vectors is derived using any of a variety of known techniques including polynomial regression, parameter fitting to a model and selecting from one of many coarse models to construct a fine(r) model, etc.

Operationally, such a single photodetector miscalibration detection and compensation generally involves: A VOR calibration on both eyes using a single photodiode per eye. The relationship between the relative eye positions over the calibration space is captured. Subsequently, when the glasses/headset slips or is removed the new relationship between relative eye positions may be used to select a new calibration function.

Generally, slip invariance implementation according to aspects of the present disclosure will require—for each individual user—a data set—including multiple glints and known eye angles (based on known stimulus location) be collected via (VOR—for example) and subsequently used to construct a model of the user's eye including eye center, cornea offset (vector between the center of the eye and center of the cornea), cornea radius and corneal asphericity for each user. The data is collected for both of the user's eyes, and is subsequently used to determine interpupillary distance and eye relief.

The per-user data is stored and retrieved upon subsequent use of the eye-tracker system to constrain the model fitting parameters for per-session calibration. Generally, each session with the headset/glasses will require determining a new scanner/detector position relative to the user. Such may be conveniently performed by requiring the user to look at one or more known locations and perform a re-centering operation.

Alternatively, re-centering may be performed by detecting an eye movement (such as VOR) with known dynamics, i.e., counter rotation of eye relative to headset rotation, for example in VOR. Note that VOR may be detected when there is a saccade-free region of equal and opposite angular velocity relative to head rotation.

Yet another way to determine headset orientation relative to the user's head position is the determine the new headset orientation based on a set of eye movements—such as VOR—by determining the headset orientation relative to the user's head based on an optimization such as maximum-likelihood estimation from the saved model.

Operationally, such an approach will generally involve constructing a user model via an exhaustive calibration using VORs, N-Points, or an alternative calibration method (s). The saved model stores known, fixed human anatomical constraints such as user IPD, corneal radius, eye radius, corneal offset, etc. Since—for a given user—the known fixed anatomical constraints cannot change, a change in headset position must yield eye movements that are consistent with the particular user's anatomical model. Accordingly, a model-fit quality score may be determined by measuring the consistency of the headset position estimate with the anatomical constraints of the user's eye movements. An incorrect model estimate violates the anatomical model constraints yielding a high model mis-fit score whereas a correct estimate produces results that are consistent with the user's anatomical features extracted from full calibration results yielding a low model mis-fit score. An optimization algorithm, such as non-linear-least squares regression may then be used to determine headset position by minimizing the model mis-fit score. One such example of a model violation is when the eyes do not converge on a fixed point in space for a given set of motions or a violation of IPD constraints.

Those skilled in the art will appreciate that the magnitude of model mis-fits score of the model fit over a period of time or eye movement magnitude interval can be treated as a measure of the accuracy of the eye tracker and reported back to the host to inform the system of eye tracker performance. Continued use of a headset/glasses in a given session allows the accumulation of more data to further constrain the relative headset position and therefore improve calibration over time and/or allow for correction of any headset drift. Such session would be reset based on headset removal which could advantageously be detected by proximity sensor in the headset.

We note at this point that in addition to calibration, yet another aspect of the present disclosure facilitates the prediction of the endpoint movement of an eye from the involuntary movements of the eye—namely "saccades."

As those skilled in the art will appreciate, saccades occur constantly to enable the human visual system to process information. Saccades are abrupt movements of the eye that are generated by the oculomotor pathway when scanning a scene. The velocity profiles of saccades are highly consistent because they are generated by dedicated neural pathways.

Figure 4:
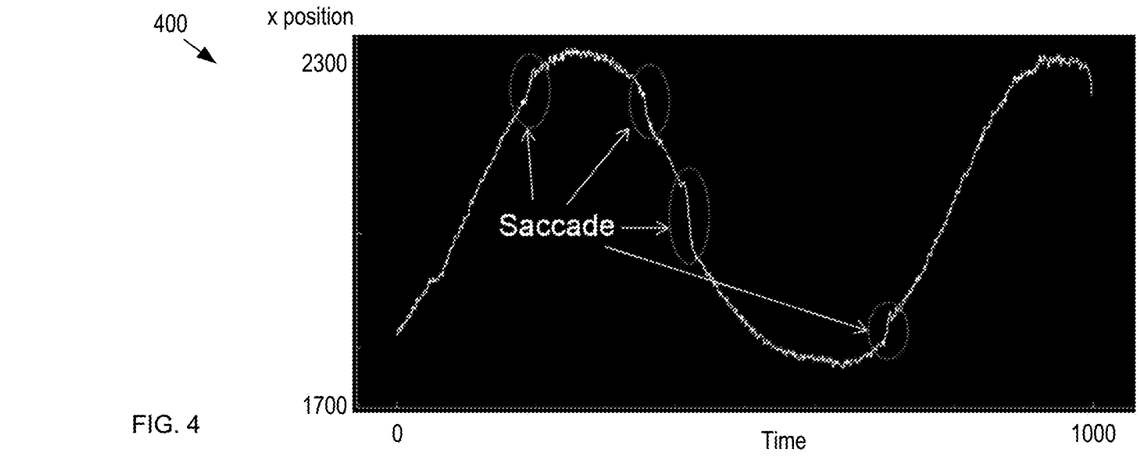
FIG. 4 is a plot of an illustrative smooth-pursuit eye movements in which several saccades are shown according to aspects of the present disclosure.
Figure 5:
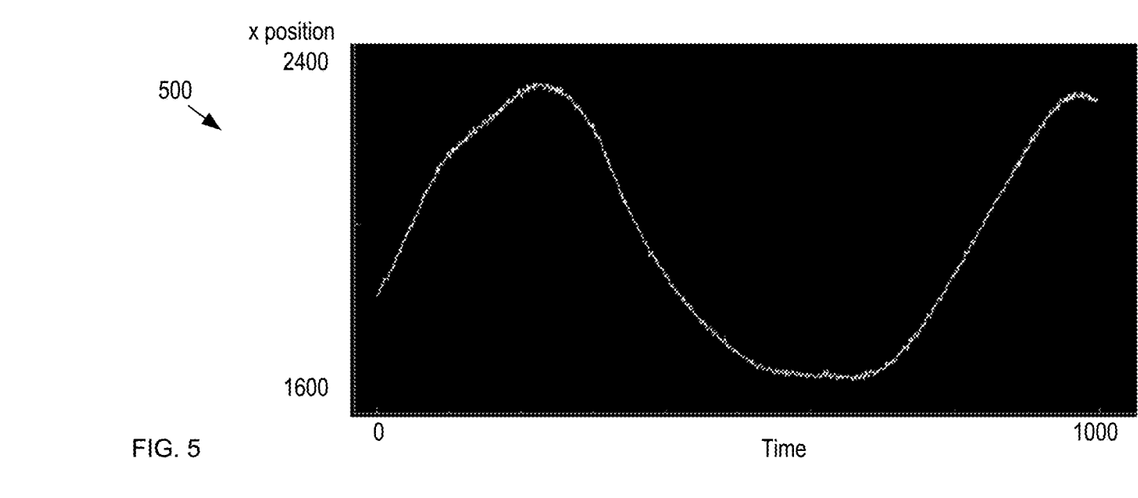
FIG. 5 is a plot of illustrating vestibulo-ocular reflex eye movements according to aspects of the present disclosure.

FIG. 4 is a plot showing smooth-pursuit eye movements. Plot 400 is a plot of eye movement, in which several saccades are readily observed and FIG. 5 is a plot of vestibulo-ocular reflex eye movements.

We note that end-point prediction requires an ability to calculate the velocity of the eye as well as position. It should be noted that accurate computation of velocity on the fly requires an eye tracking system that exhibits a sampling rate high enough to perform some filtering on the position data before computing the position data prior to determining the derivative (velocity) of same.

Figure 6:
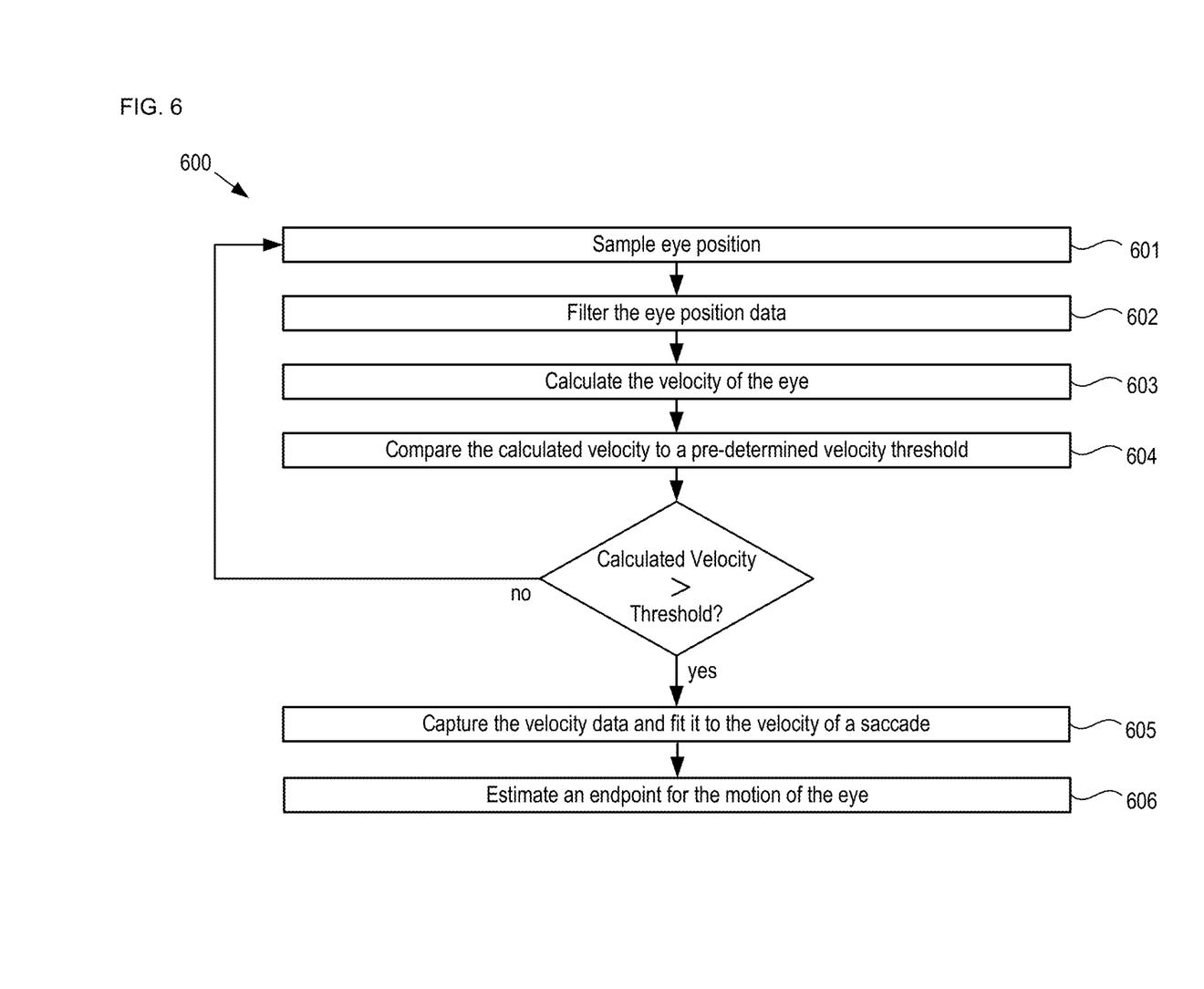
FIG. 6 is a flow diagram depicting an illustrative operations of a method useful for predicting end points of an eye in motion according to aspects of the present disclosure.

FIG. 6 is a flow diagram outlining operations of a method according to the present disclosure for predicting the end point of an eye in motion. Such method begins at step 601 wherein the eye position of a user is sampled. At step 602, the eye position data is filtered. In some embodiments this filtering may be effected using a simple moving-average filter. In alternative embodiments, this filtering may be effected using a 1-Euro filter. In still alternative embodiments, this filtering such as a Kalman filter may be employed.

At step 603, a velocity of the eye is determined. Such velocity may be conveniently determined using a difference operation. At step 604, the eye velocity is compared to a pre-determined velocity threshold that is based on a typical saccade. If the calculated eye velocity is greater than the velocity threshold, it is assumed that a saccade is occurring. If such a saccade is detected, step 605 captures velocity data and fits a velocity profile to a saccade.

Figure 7:
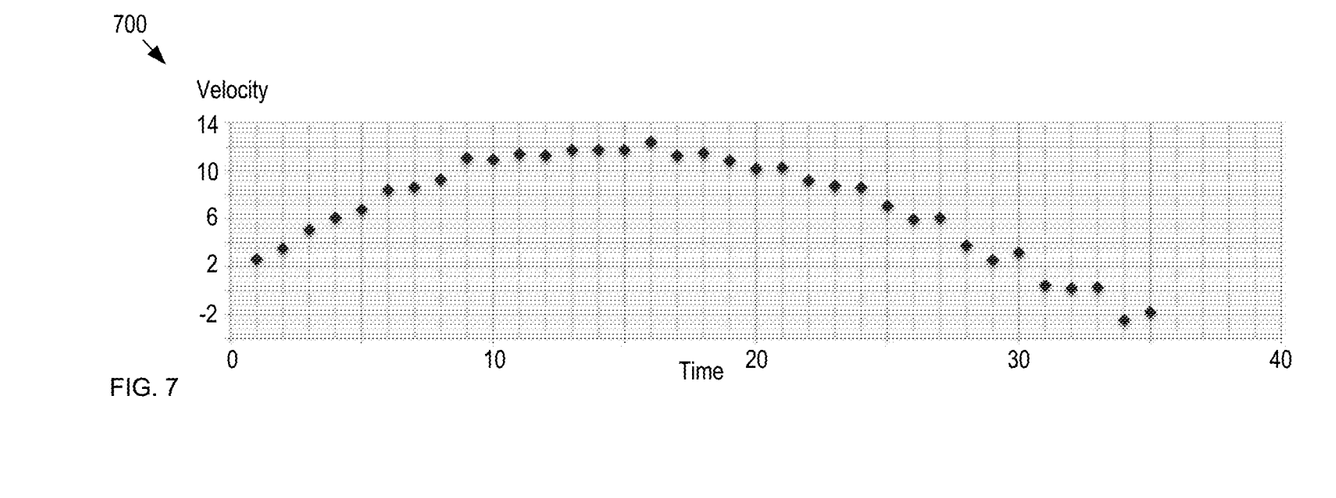
FIG. 7 shows a plot illustrating eye velocity vs time according to aspects of the present disclosure.
Figure 8:
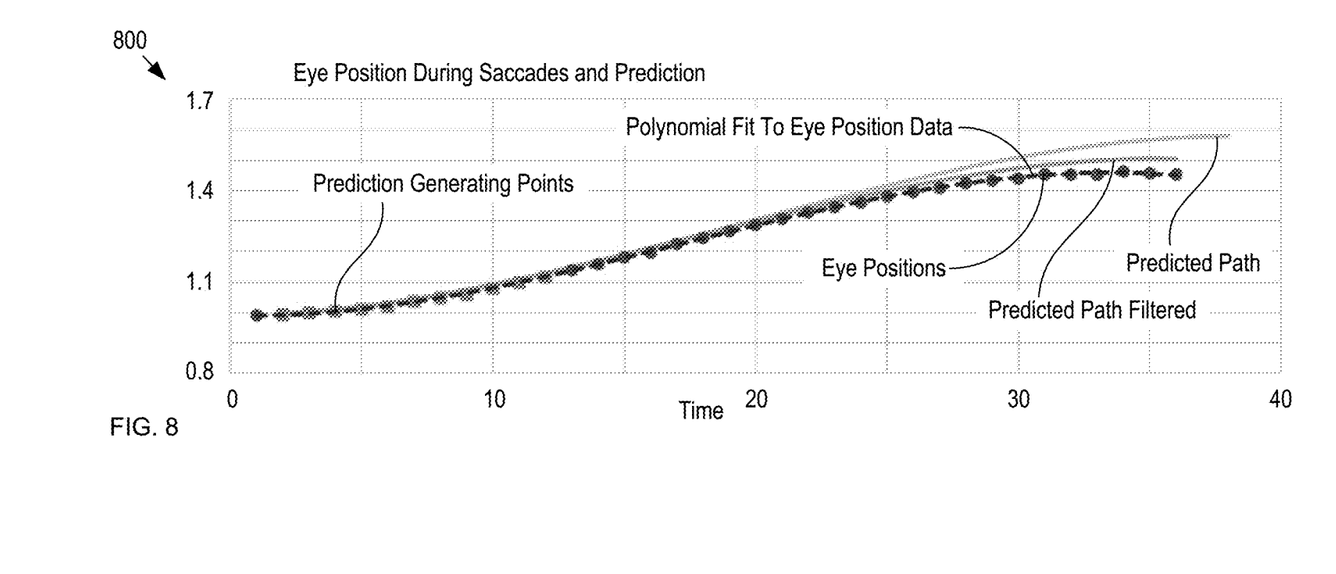
FIG. 8 shows plots of measured eye positions and points used to generate predictions of future eye position(s) and predicted path of an eye aspects of the present disclosure.

At step 606, an endpoint for the eye motion is estimated. In some embodiments, the end point estimate may be determined by a simple lookup taple that associates peak velocity with saccade amplitude. In alternative embodiments, the end-point estimate is determined by fitting the velocity data to a curve—i.e., a parabola. In still alternative embodiments, the end-point estimate is determined by fitting the velocity data to a cubic function. In still alternative embodiments, the end-point estimate is determined by integrating the area under a fitted velocity curve. Still other estimate methods may be available and within the disclosure presented herein. FIG. 7, is a plot of eye velocity vs. time, and FIG. 8 is a plot of measured eye position and points used to generate predictions of future positions and a predicted path of an eye.

We note that the use of velocity information from a calibrated eye tracker including calibration by methods according to the present disclosure—to predict the endpoint of a saccade may employ a Bayesian-type filter to infer the innervation of a user's extraocular muscles, which, given fast, low latency measurements of the user's eye movements, can be used to predict the forces which drive the eye movement. Forward-integrated over time, these forces predict the resting position of a user's eue, given a mechanical model of the extraocular musculature.

Such model(s) can also be simplified to a numerical fit using a recent history of eye tracking data as input. It is often feasible to perform this model fit by first conditioning the eye tracking data to calculate a velocity estimate which is known by those skilled in the art to be well correlated with saccade amplitude.

At this point, while we have presented this disclosure using some specific examples, those skilled in the art will recognize that our teachings are not so limited. Accordingly, this disclosure should be only limited by the scope of the claims attached hereto.

The invention claimed is:

1. An eye-tracker calibration method comprising:
   arranging a system and a user's head in a first arrangement, wherein the system includes a head tracker and the eye-tracker;
   having the user look at a fixed point in space;
   having the user rotating his/her head about an axis;
   collecting head positional and eye-tracking data including eye angle, wherein the eye angle is determined by:
   (i) scanning a light signal in a two-dimensional pattern over a scan region of the eye;
   (ii) detecting reflected light from the scan region at a first discrete detector, wherein the first discrete detector provides a first electrical signal based on the reflected light, and wherein the first electrical signal includes no spatially correlated image information;
   (iii) detecting a first extremum in the first electrical signal;
   (iv) estimating a first location of a surface feature in the scan region based on the first extremum; and
   (v) estimating the eye angle based on the first location; and
   generating a map of the user's eye angle to gaze vector.

2. The method of claim 1 wherein the surface feature is a cornea.

3. The method of claim 1 further comprising:
   detecting reflected light from the scan region at a plurality of discrete detectors that provides a plurality of electrical signals, wherein the plurality of discrete detectors includes the first discrete detector and the plurality of electrical signals includes the first electrical signal;
   detecting a plurality of extrema that includes at least one extremum in each electrical signal of the plurality thereof, wherein the plurality of extrema includes the first extrema; and
   estimating the first location based on the plurality of extrema.

4. The method of claim 3 wherein the fixed point in space is unknown.

5. The method of claim 1 wherein the first location is estimated based on timing information associated with the extremum.

6. The method of claim 1 further comprising:
   constructing a profile for the user, wherein the profile includes at least one of:
      a model of each eye of the user, the model including at least one of eye center, cornea offset, cornea radius, and corneal asphericity;
      interpupillary distance between the user's eyes; and
      eye relief;
   determining a second arrangement of the system and the user's head; and
   compensating for the difference in the first and second arrangements based on the profile.

7. The method of claim 1 wherein the two-dimensional pattern is a Lissajous pattern.

8. The method of claim 1 further comprising predicting a saccade endpoint by operations that include:
   determining a plurality of locations of the surface feature in the scan region;
   filtering the plurality of locations;
   determining a velocity for the motion of the surface feature based on the filtered plurality of locations;
   if the velocity is greater than a threshold value, determining a velocity profile for the motion; and
   estimating the saccade endpoint based on the velocity profile.

9. The method of claim 8 wherein the saccade endpoint is determined by an operation selected from the group consisting of:
   accessing a lookup table that associates peak velocity and saccade amplitude;
   fitting the velocity profile to a parabolic function;
   fitting the velocity profile to a cubic function; and
   fitting the velocity profile to a function and integrating the area under the curve of the function.

10. An eye-tracker calibration method comprising:
    operatively coupling a system relative and a user's head such that the system and user's head are in a first arrangement, wherein the system includes a head tracker and the eye-tracker;
    having the user look at a fixed point in space;
    collecting head positional and eye-tracking data during a vestibulo-ocular reflex (VOR), wherein the eye-tracking data includes eye angle data for a first eye of the user, wherein the eye angle is determined by:
    (i) scanning a light signal in a two-dimensional pattern over a scan region of the eye;
    (ii) detecting reflected light from the scan region at a first discrete detector, wherein the first discrete detector provides a first electrical signal based on the reflected light, and wherein the first electrical signal includes no spatially correlated image information;
    (iii) detecting a first extremum in the first electrical signal;

(iv) estimating a first location of a surface feature in the scan region based on the first extremum; and
(v) estimating the eye angle based on the first location;
generating a plurality of data pairs, each data pair including a head position and a corresponding eye angle; and
generating a map of the user's eye angle to gaze vector based on the plurality of data pairs.

11. The method of claim 10 further comprising:
detecting reflected light from the scan region at a plurality of discrete detectors that provides a plurality of electrical signals, wherein the plurality of discrete detectors includes the first discrete detector and the plurality of electrical signals includes the first electrical signal;
detecting a plurality of extrema that includes at least one extremum in each electrical signal of the plurality thereof, wherein the plurality of extrema includes the first extrema; and
estimating the first location based on the plurality of extrema.

12. The method of claim 11 wherein the fixed point in space is unknown.

13. The method of claim 10 wherein the first location is estimated based on timing information associated with the extremum.

14. The method of claim 10 further comprising constructing a profile for the user, wherein the profile includes at least one of:
a model of each eye of the user, the model including at least one of eye center, cornea offset, cornea radius, and corneal asphericity;
interpupillary distance between the user's eyes; and
eye relief.

15. The method of claim 14 further comprising:
detecting a second arrangement of the system and the user's head; and
compensating for the difference between the first and second arrangements based on the profile of the user.

16. The method of claim 10 further comprising predicting a saccade end-point by operations that include:
detecting the occurrence of a saccade based on motion of the surface feature; and
during the duration of the saccade, determining an endpoint for the saccade.

17. The method of claim 16 wherein the saccade endpoint is determined by an operation selected from the group consisting of:
determining a velocity of the surface feature and accessing a lookup table that associates peak velocity and saccade amplitude;
estimating a velocity profile for a motion of the surface feature and fitting the velocity profile to a parabolic function;
estimating a velocity profile for a motion of the surface feature and fitting the velocity profile to a cubic function; and
estimating a velocity profile for a motion of the surface feature, fitting the velocity profile to a function, and integrating the area under the curve of the function.

18. The method of claim 16 wherein the occurrence of the saccade is detected by:
determining a velocity for the motion of the surface feature based on a filtered plurality of locations of the surface feature; and
comparing the velocity to a threshold value.

* * * * *

UNITED STATES PATENT AND TRADEMARK OFFICE
CERTIFICATE OF CORRECTION

PATENT NO. : 10,908,683 B2  
APPLICATION NO. : 16/236993  
DATED : February 2, 2021  
INVENTOR(S) : Niladri Sarkar et al.

Page 1 of 1

It is certified that error appears in the above-identified patent and that said Letters Patent is hereby corrected as shown below:

On the Title Page

(72) Inventors should read: Niladri Sarkar, Waterloo (CA); Fan Yang, London (CA); Arash Rohani, Waterloo (CA); Brendan Redmond O'Hanlon, Kitchener (CA)

Signed and Sealed this  
Twenty-ninth Day of October, 2024

Katherine Kelly Vidal  
*Director of the United States Patent and Trademark Office*